Patented Aug. 8, 1944

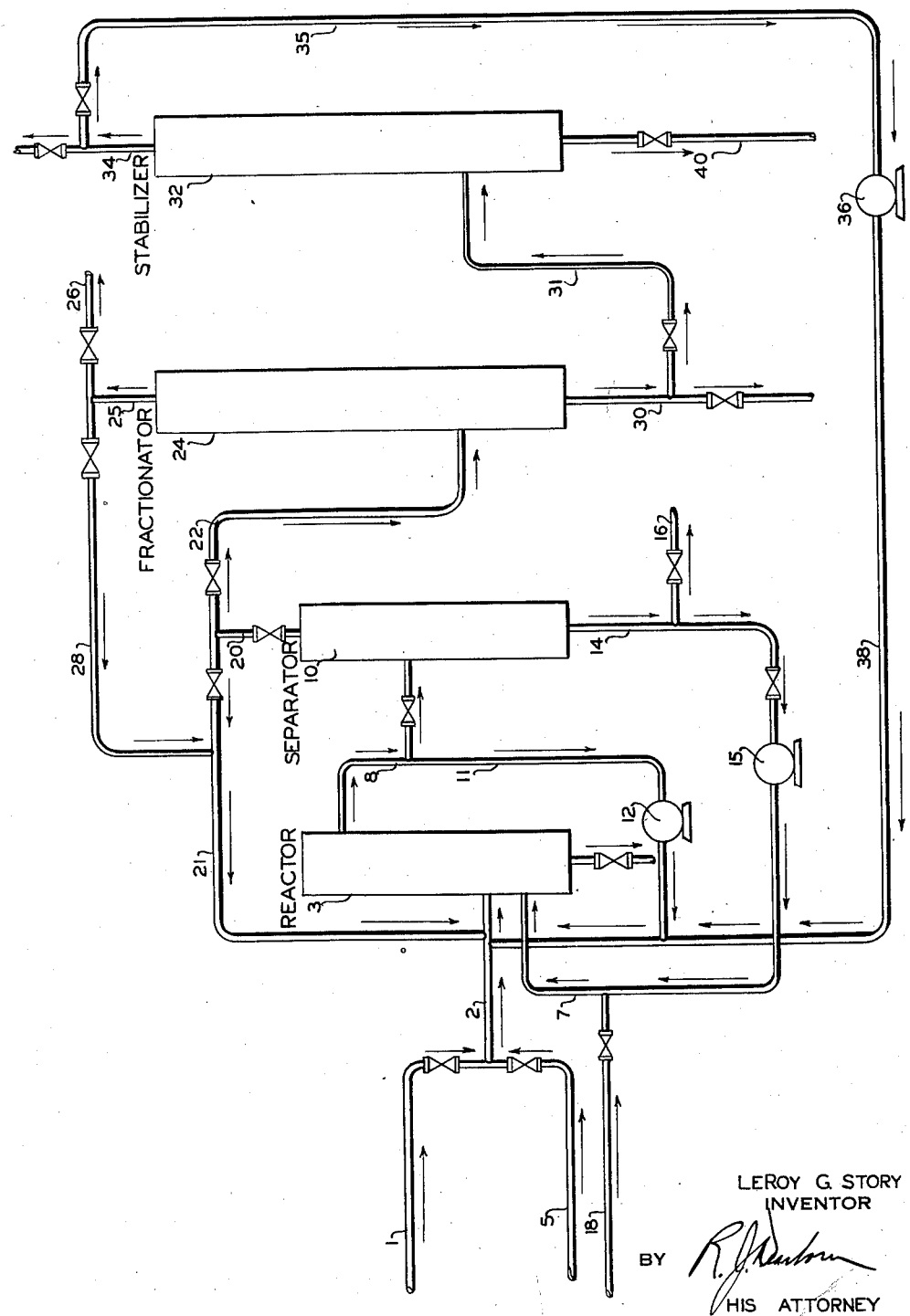

2,355,339

UNITED STATES PATENT OFFICE 2,355,339

MANUFACTURE OF MOTOR FUELS

Le Roy G. Story, Chicago, Ill., assignor to The Texas Company, New York, N. Y., a corporation of Delaware Original application March 21, 1939, Serial No. 263,114. Divided and this application April 20, 1943, Serial No. 483,747

12 Claims. (Cl. 260—683.4)

This invention relates to the manufacture of motor fuels and has to do more particularly with the production of high anti-knock hydrocarbons from olefins and paraffins.

This is a division of my copending application, Serial No. 263,114, filed March 21, 1939.

In accordance with the invention, paraffins and olefins, including normal and iso-olefins and normal and isoparaffins, are subjected to the action of a catalyst in the presence of hydrogen whereby high anti-knock, chiefly saturated, branch chain hydrocarbons within the gasoline boiling point range are formed.

An object of the present invention is to obtain alkylation of normal or isoparaffins with olefins.

Another object of the invention is to obtain polymerization and hydrogenation of a portion of the olefins in an olefin and paraffin mixture, and to obtain alkylation of paraffins with another portion of the olefins.

Another object of the invention is to control and regulate the amount of polymerization and alkylation whereby an increased amount of desired high anti-knock hydrocarbons is formed.

A further object of the invention is to prevent undesirable side reactions and increase the yield of desired hydrocarbons.

A further object of the invention is to prevent catalyst deterioration whereby the life of the catalyst is substantially increased.

A further object of the invention is to provide means whereby paraffin and olefin hydrocarbon mixtures containing a relatively large proportion of olefins may be successfully converted into large yields of saturated branch chain hydrocarbons.

It has been known heretofore that isoparaffins may be alkylated with olefins in the presence of catalysts, such as sulfuric acid or aluminum chloride, providing a high ratio of isoparaffins to olefins is maintained in the reaction mixture. It has also been proposed to alkylate normal paraffins with olefins in the presence of a catalyst such as aluminum halide and hydrogen halide by using a substantial excess of normal paraffins in the reaction mixture. In these operations, however, side reactions and deterioration of the catalyst occurs, particularly if a high ratio of paraffins to olefins is not maintained.

It has now been found that it is advantageous to carry out reactions involving alkylation in the presence of hydrogen or a hydrogen-producing material or a hydrogen-containing gas.

The amount of hydrogen may vary considerably, for example, a hydrogen pressure of 50, 100, 150, 300, 500, 1000 or 3000 pounds may be used. It is preferable to use a hydrogen pressure of about 50 to 500 or 1000 pounds. Hydrogenation may occur or the hydrogen may function primarily to control the course of the reactions and increase the life of the catalyst.

The catalysts contemplated are sulfuric acid of about 95 to 100% and preferably about 94 to 98% $H_2SO_4$; a metallic halide alone, or preferably with a hydrogen halide, such as $AlCl_3$ or $BF_3$ and HCl or HF; a metallic halide and a metal, with or without a hydrogen halide, such as $AlCl_3$, Al, and HCl, or $BF_3$, HF and Ni; liquid hydrogen fluoride; and mixed metallic halides such as sodium aluminum chloride. A metal, or compound of a metal, such as an oxide or sulfide of a metal of group VI, particularly chromium, molybdenum or tungsten, may also be used. Mixtures of the above catalysts are contemplated, whereby combined hydrogenation and alkylation, or combined alkylation, polymerization and hydrogenation, are obtained. Thus, $AlCl_3$ and/or the compounds of metals of group VI are intended; for example, aluminum chloride and compounds, such as chromium, zirconium or molybdenum oxides and sulfides.

It is to be understood that whenever a metallic halide is specified the corresponding hydrogen halide may also be used.

The temperatures of operation will depend somwhat upon the materials treated, the catalyst, and the nature of the reaction involved. Broadly, temperatures of about −10° to 100° 150°, 200°, or 250° C. or over are contemplated, although ordinarily temperatures of 0 to 75° C. are desirable.

The hydrocarbons to be treated may comprise isoparaffins, olefins and normal paraffins, either gaseous or liquid. Low-boiling paraffins and olefins, such as normally gaseous hydrocarbons of two to five carbon atoms, for example, cracking still gases, are suitable, although gasoline hydrocarbons or heavier, either straightrun or cracked, are contemplated. Some of the more specific applications of the invention will now be discussed.

The alkylation of normal paraffins with olefins has not been practical heretofore because more drastic conditions and a more active catalyst than for the alkylation of isoparaffins are desirable. However, when such conditions are used even in the presence of a large excess of normal paraffins, side reactions and catalyst deterioration are troublesome. When using considerable pressure of hydrogen, more drastic conditions may be used with success whereby polymerization, splitting and catalyst deterioration are substantially prevented.

The alkylation of higher boiling paraffins and olefins, such as occurs in cracked gasoline, has been difficult to carry out because of large catalyst and polymerization losses. For example, the alkylation of the olefins in a cracked gasoline with isoparaffins usually causes excessive catalyst consumption, thereby rendering the operation impractical. A substantial pressure of hydrogen largely eliminates such difficulties.

It is often desirable to alkylate a C₄ fraction from cracking stills containing both normal and isobutylene, and normal and isobutane, but because the olefins are in excess, it has been customary to add an excess of extraneous isobutane. By introducing hydrogen, such a fraction may be alkylated without extraneous isobutane, particularly when using active catalysts, such as aluminum chloride or mixed metal chlorides, and good yields of alkylate apparently from alkylating both normal and isoparaffins, and a substantially saturated product, are obtained.

Heretofore it has been customary to selectively polymerize isobutylene in a cracking still gas to di-isobutylene and hydrogenate the latter to iso-octane. The normal butenes may then be alkylated with isobutane in the presence of an alkylation catalyst using an excess of isobutane. The products may then be blended to obtain a high octane product. According to the present invention, the above operations may be carried out in one step instead of two by using hydrogen and a suitable catalyst. For example, a C₄ cracked gas containing about 30% butylenes, 15% isobutane and 55% normal butane may be converted substantially entirely into gasoline of high anti-knock value. A product approaching in anti-knock value that produced by the two-step process may be obtained, indicating that the reaction is much more selective in producing isoparaffins of high anti-knock value.

In the latter example, it is advantageous to operate whereby the isobutylene is converted mainly into iso-octane, while the normal butenes are converted into mixed isoparaffins which may have a wider boiling range approaching that of gasoline. For such a result, it may be desirable to use a mixture of catalysts which may produce at least some hydrogenation and polymerization, such as aluminum chloride and/or compounds of metals of group VI specified. While the reactions are not fully understood, possible reactions are selective polymerization and hydrogenation of isobutylenes to hydrogenated di-isobutylenes or iso-octanes, selective alkylation of isobutane with isobutylene to produce iso-octanes, polymerization or cross-polymerization of the isobutylenes and normal butylenes to form polymers which are hydrogenated and/or selectively alkylated by the isobutane. Regardless of the nature of the reaction, the iso-octane content of the gasoline fraction may be appreciably increased and a high octane product obtained.

At the higher alkylation temperatures specified above, such as 150° C. and above, the mentioned metal oxides and sulfides of group VI are known to have appreciable hydrogenation activity; and the contacting of the paraffins and olefins in the presence of an alkylation catalyst and a hydrogenation catalyst that has appreciable hydrogenation activity at the said alkylating conditions in the manner above described, particularly in the presence of added hydrogen, results in the aforementioned production of large yields of saturated branch chain hydrocarbons useful as high octane motor fuel.

The alkylation of paraffins with lower boiling olefins, such as ethylene and propylene, is considerably facilitated by operating in the presence of hydrogen. Higher temperatures may be used, more selective reaction or less side reactions and less catalyst deterioration may be obtained.

The accompanying drawing is a diagrammatic sketch of one form of apparatus for carrying out the process of the invention.

Referring to the drawing, the hydrocarbons may be introduced into the system through branch line 1, which communicates with the main line 2 leading to a reaction chamber 3. Hydrogen may be introduced through the branch line 5 which also communicates with the line 2. While one line is shown for introducing the hydrocarbons, it is to be understood that any number of lines may be used in case it is desirable to separately inject the olefins and isoparaffins. Also, a separate line for injecting the hydrogen may be used, if desired. In the reactor 3, the hydrocarbons and hydrogen are intimately contacted with the catalyst introduced through the line 7. The reactor may be provided with a suitable agitator or other means of contact, whereby the catalyst, hydrogen and hydrocarbons are intimately contacted and a suitable reaction time provided.

The products are conducted from the reactor 3 through the line 8 to a separator 10. Any portion of the products withdrawn through line 8 may be recycled to the reactor through the line 11 by the pump 12. The lines 8, 11 and pump 12 constitute an internal recycle stream into which the hydrocarbons and hydrogen from lines 1, 5 and 2 are preferably injected. It is desirable to maintain a relatively high ratio of products recycled internally to the fresh charge introduced through the line 2.

In the separator 10 hydrocarbons separate from the catalyst which collects in the lower portion of the separator. The separated catalyst is withdrawn through the line 14 and may be forced by the pump 15 through the line 7 to the reactor 3. Any portion of the separated catalyst may be withdrawn from the system through the line 16. Fresh make-up catalyst may be charged to the system through the line 18 which communicates with the line 7.

The hydrocarbons collecting in the upper portion of the separator 10 are withdrawn through the line 20. Any portion or all of the hydrocarbons may be returned to the reactor 3 through the branch line 21. The remainder of the hydrocarbons is conducted through the branch line 22 to a fractionator 24, which is preferably maintained under sufficient pressure to maintain the hydrocarbons in the liquid phase. Provision is made whereby hydrogen may be withdrawn from the top of the fractionator through the line 25 and discharged from the system through the branch line 26 or recycled to the system through the branch line 28 which communicates with the line 21 leading to the reactor 3.

The hydrocarbons are withdrawn from the fractionator 24 through the line 30 and are preferably passed through the line 31 to a stabilizer 32. In the stabilizer the light hydrocarbons, comprising mainly isobutane, which are undesirable in the alkylate, are separated and released from the top of the stabilizer through the line 34. Any portion or all of the gases may be recycled through the branch line 35, pump 36 and line 38 to the internal recycle stream in line 11. The stabilized alkylate is withdrawn from the stabilizer through the line 40.

The feature of catalytic isoparaffin-olefin alkylation in the presence of an alkylation catalyst at comparatively low or mild temperatures, and with added hydrogen to maintain a substantial hydrogen pressure within the alkylation reactor, is claimed in my said parent application, Serial No. 263,114. The feature of alkylating paraffins with olefins under alkylating conditions in the presence of an alkylation catalyst and a hydrogenation catalyst that has appreciable hydrogenation activity at said alkylating conditions is claimed in the present divisional application.

Obviously many modifications and variations of the invention, as hereinbefore set forth, may be made without departing from the spirit and scope thereof, and therefore only such limitations should be imposed as are indicated in the appended claims.

I claim:

1. The process of alkylating paraffins with olefins wherein paraffins and olefins are charged to the alkylation reaction which comprises contacting the paraffins and olefins under alkylating conditions in the presence of an alkylation catalyst and a hydrogenation catalyst that has appreciable hydrogenation activity at said alkylating conditions.

2. The process of manufacturing high octane motor fuel by alkylating normally gaseous paraffins with normally gaseous olefins wherein paraffins and olefins are charged to the alkylation reaction which comprises contacting the paraffins and olefins under alkylating conditions in the presence of an alkylation catalyst and a hydrogenation catalyst that has appreciable hydrogenation activity under said alkylating conditions.

3. The process of alkylating paraffins with olefins wherein paraffins and olefins are charged to the alkylation reaction which comprises contacting the paraffins and olefins under alkylating conditions in the presence of an alkylation catalyst and a hydrogenation catalyst that has appreciable hydrogenation activity at said alkylating conditions, and in the presence of extraneously-added hydrogen.

4. The process of manufacturing high octane motor fuel by alkylating normally gaseous paraffins with normally gaseous olefins wherein paraffins and olefins are charged to the alkylation reaction which comprises contacting the paraffins and olefins under alkylating conditions in the presence of an alkylation catalyst and a hydrogenation catalyst that has appreciable hydrogenation activity under said alkylating conditions, and in the presence of extraneously-added hydrogen.

5. The process according to claim 1, wherein the alkylation catalyst comprises a metallic halide.

6. The process according to claim 1, wherein the alkylation catalyst comprises mixed metallic halides.

7. The process according to claim 1, wherein the hydrogenation catalyst is selected from the group consisting of a metal of Group VI of the periodic table of elements, and an oxide or sulfide of such a metal.

8. The process according to claim 1, wherein the hydrogenation catalyst comprises an oxide of chromium.

9. The process of manufacturing high octane motor fuel by alkylating paraffins with olefins, which comprises contacting the paraffins and olefins at an elevated temperature above about 150° C. and under a substantial superatmospheric pressure under alkylating conditions in the presence of an alkylation catalyst and a hydrogenation catalyst that has appreciable hydrogenation activity at said alkylating conditions.

10. The process of manufacturing high octane motor fuel by alkylating normally gaseous paraffins with normally gaseous olefins, which comprises contacting the normally gaseous paraffins with normally gaseous olefins at an elevated temperature above about 150° C. and under a substantial superatmospheric pressure of added hydrogen under alkylating conditions in the presence of an alkylation catalyst and a hydrogenating catalyst that has appreciable hydrogenating activity at said alkylating conditions.

11. The process according to claim 10, wherein the alkylation catalyst comprises a metallic halide, and the hydrogenation catalyst comprises an oxide of a metal of group VI of the periodic table of elements.

12. The process according to claim 10, wherein the alkylation catalyst comprises a metallic halide, and the hydrogenation catalyst comprises an oxide of chromium.

LE ROY G. STORY.